(12) United States Patent
Pugh (10) Patent No.: US 8,764,450 B2
(45) Date of Patent: Jul. 1, 2014

(54) CLINICAL ASSESSMENT AND TRAINING SYSTEM

(76) Inventor: Carla M. Pugh, Chicago, IL (US)

( * ) Notice: Subject to any disclaimer, the term of this patent is extended or adjusted under 35 U.S.C. 154(b) by 500 days.

(21) Appl. No.: 12/371,392

(22) Filed: Feb. 13, 2009

(65) Prior Publication Data

US 2009/0208915 A1   Aug. 20, 2009

Related U.S. Application Data

(60) Provisional application No. 61/029,202, filed on Feb. 15, 2008.

(51) Int. Cl.
*G09B 23/30* (2006.01)
(52) U.S. Cl.
CPC ..................... *G09B 23/30* (2013.01)
USPC ............ 434/267; 434/262; 434/272; 434/270
(58) Field of Classification Search
CPC .......... G09B 9/00; G09B 23/28; G09B 23/30; G09B 23/32
USPC .................... 434/262, 267, 263, 272; 600/300
See application file for complete search history.

(56) References Cited

U.S. PATENT DOCUMENTS

| | | | |
|---|---|---|---|
| 2,495,568 A | 1/1950 | Coel | |
| 3,520,071 A * | 7/1970 | Clark et al. | 434/265 |
| 3,921,311 A | 11/1975 | Beasley et al. | |
| 4,360,345 A | 11/1982 | Hon | |
| 4,907,973 A | 3/1990 | Hon | |
| 5,472,345 A | 12/1995 | Eggert | |
| 5,800,177 A | 9/1998 | Gillio | |
| 5,800,178 A | 9/1998 | Gillio | |
| 5,800,179 A | 9/1998 | Bailey | |
| 5,853,292 A * | 12/1998 | Eggert et al. | 434/262 |
| 5,882,206 A | 3/1999 | Gillio | |
| 6,428,323 B1 | 8/2002 | Pugh | |
| 6,575,757 B1 * | 6/2003 | Leight et al. | 434/273 |
| 7,192,284 B2 * | 3/2007 | Eggert et al. | 434/268 |
| 7,665,995 B2 * | 2/2010 | Toly | 434/262 |
| 7,794,412 B2 * | 9/2010 | Turnbull et al. | 600/587 |
| 7,931,470 B2 * | 4/2011 | Alexander et al. | 434/262 |
| 8,480,406 B2 * | 7/2013 | Alexander et al. | 434/270 |
| 2003/0031993 A1 * | 2/2003 | Pugh | 434/262 |
| 2004/0197764 A1 * | 10/2004 | Stump et al. | 434/433 |
| 2007/0003917 A1 * | 1/2007 | Kitching et al. | 434/272 |
| 2009/0148822 A1 * | 6/2009 | Eggert et al. | 434/271 |

* cited by examiner

*Primary Examiner* — Nikolai A Gishnock
*Assistant Examiner* — Banafsheh Hadizonooz
(74) *Attorney, Agent, or Firm* — Lumen Patent Firm (57) ABSTRACT

A system for medical training includes an anatomical simulator modeled after at least a portion of a body, the simulator including at least one external surface, and at least one cavity in fluidic communication with the external surface via a cavity. The system further includes at least one internal sensor positioned at an internal location of the anatomical simulator, the internal sensor positioned to receive an internal input based on forces applied from within the cavity, at least one external sensor positioned at an external location of the anatomical simulator and to receive an external input based on forces applied to the external surface, and a feedback display system in communication with the sensors to simultaneously record external sensor readings from the at least one external sensor and internal sensor readings from the at least one internal sensor and at least one time measurement device.

7 Claims, 8 Drawing Sheets

CLINICAL ASSESSMENT AND TRAINING SYSTEM

RELATED APPLICATIONS

This application claims the benefit of, and priority to U.S. Provisional Patent Application 61/029,202 filed Feb. 15, 2008, the entirety of which is incorporated herein by reference.

FIELD OF THE INVENTION

The present invention relates generally to a system and method for practicing and teaching medicine. More specifically, the invention relates to an anatomical simulator system having sensors and a means for providing feedback to a user in medical training.

DESCRIPTION OF THE RELATED ART

Anatomical simulators have been developed for training and assessment of medical students, nursing students, medics and practitioners. These simulators have enabled health care professionals of all backgrounds to practice clinical procedures in a safe environment, away from the patient. The majority of simulators that have been developed thus far focus mainly on emergency care, anesthesia and laparoscopic surgery. In addition, simulators have been developed for examination of body cavities, as described in U.S. Pat. No. 6,428,323, the disclosure of which is incorporated herein by reference.

In simulators where direct or indirect manual contact is required to practice an examination or procedure, performance evaluation is usually handled in the following ways: 1) performance is not measured or assessed; 2) performance is assessed in a summative fashion and simply marked as complete or incomplete; or 3) performance is measured by placing sensors on the instruments, in which case, the path of the instrument is recorded but the effect of the instrument on an organ or body surface is not measured.

Two examples of medical procedures that combine direct and indirect contact are endotracheal intubation and needle biopsy or aspiration. Both procedures have potentially serious complications if not done correctly. For intubation, an endotracheal tube is inserted in the patient's airway to maintain an open passage and allow air to pass freely to and from the lungs for ventilation. The most feared complication, usually due to operator experience or patient anatomy is a 'missed intubation' or inability to insert the endotracheal tube into the airway. Even if successful, potential complications that may occur during intubation include injury to the teeth, lips and oral cavity; edema; bleeding; tracheal and esophageal perforation; pneumothorax (collapsed lung); and aspiration. Further life-threatening complications of airway problems may occur and these signs and symptoms include, but are not limited to, sore throat, pain or swelling of the face and neck, chest pain, subcutaneous emphysema, and difficulty swallowing.

Needle biopsy or aspiration also has risks. A recent study showed that in one case a needle biopsy of a liver tumor resulted in major bleeding. Other complications depend upon the body part on which the biopsy takes place: Lung biopsies are frequently complicated by pneumothorax (collapsed lung). This complication can also accompany biopsies in the upper abdomen near the base of the lung. About one-quarter to one-half of patients having lung biopsies will develop pneumothorax. A small percentage of patients will develop a pneumothorax serious enough to require hospitalization and placement of a chest tube for treatment—a procedure which also requires simultaneous use of direct and indirect contact. Although it is impossible to predict in whom this will occur, collapsed lungs are more frequent and more serious in patients in whom the biopsy is difficult to perform. Breast biopsies may also be complicated by pneumothorax. For biopsies of the liver, bile leakages may occur. Pancreatitis (inflammation of the pancreas) may occur after biopsies in the area around the pancreas. Deaths have been reported from needle aspiration biopsies, but such outcomes are extremely rare.

Performance of other medical procedures could improve with improved training devices. For example, inserting a needle or catheter into a central line or arterial line typically requires palpation and can be for femoral, subclavian, jugular arteries and the central venous system. For another example, a central venous catheter (CVC or central venous line or central venous access catheter) is a catheter placed into a large vein in the neck, chest or groin, this is inserted by a physician when the patient needs, for example, frequent or intensive cardiovascular monitoring, for assessment of fluid status, and for increased viability of intravenous drugs/fluids. The most commonly used veins are the internal jugular vein, the subclavian vein and the femoral vein. This is in contrast to a peripheral line which is usually placed in the arms or hands. The Seldinger technique is generally employed to gain central venous access. Examples of these devices include Hickman catheters, which require clamps to make sure the valve is closed, and Groshong catheters, which have a valve that opens as fluid is withdrawn or infused and remains closed when not in use.

Ultrasound has become an important tool for guidance of instruments or needles inserted into a cavity. Ultrasound is frequently used in the placement of internal jugular vein catheters. The ultrasound has a transducer that is applied to the surface and a needle is inserted into the vein or artery.

Vaginal ultrasound involves external palpation and insertion of devices. Pressure is typically put on the abdomen during vaginal ultrasound. Transvaginal ultrasound is a method to look at a woman's reproductive organs, including the uterus, ovaries, cervix, and vagina. The procedure comprises a patient lying on a table with knees bent and feet in holders called stirrups. The health care provider places a probe, called a transducer, into the vagina. The probe is covered with a condom and a gel. The probe sends out sound waves, which reflect off body structures. A computer receives these waves and uses them to create a picture. The doctor can immediately see the picture on a nearby monitor. The health care provider moves the probe within the area to see the pelvic organs and sometimes puts pressure on the abdomen.

Childbirth, with and without complications, such as breach and/or shoulder dystocia, involves exterior palpation and insertion of devices or instruments. For example, the McRoberts maneuver has proven effectiveness in the management of shoulder dystocia. This procedure results in a cephalad rotation of the symphysis pubis and a flattening of the sacral promontory. These motions push the posterior shoulder over the sacral promontory, allowing it to fall into the hollow of the sacrum, and rotate the symphysis over the impacted shoulder. When this maneuver is successful, the fetus should be delivered with normal traction. The McRoberts maneuver alone is believed to relieve more than 40 percent of all shoulder dystocias and, when combined with suprapubic pressure, resolves more than 50 percent of shoulder dystocias.

Rotation maneuvers may require episiotomy to gain posterior vaginal space for the physician's hand. The Rubin II maneuver consists of inserting the fingers of one hand vaginally behind the posterior aspect of the anterior shoulder of the fetus and rotating the shoulder toward the fetal chest. This motion will adduct the fetal shoulder girdle, reducing its diameter. The McRoberts maneuver also can be applied during this maneuver and may facilitate its success.

Examination for a hernia typically involves palpation of exterior and interior anatomy. In a patient with a large hernia, physical examination reveals an obvious swelling or lump in the inguinal area. In the patient with a small hernia, the affected area may simply appear full. Palpation of the inguinal area while the patient is performing Valsalva's maneuver confirms the diagnosis. To detect a hernia in a male patient, the patient is asked to stand with his ipsilateral leg slightly flexed and his weight resting on the other leg. The examiner inserts an index finger into the lower part of the scrotum and invaginates the scrotal skin so the finger advances through the external inguinal ring to the internal ring (about 1½" to 2" [4 cm to 5 cm] through the inguinal canal). The patient is then told to cough. If the examiner feels pressure against the fingertip, an indirect hernia exists; if pressure is felt against the side of the finger, a direct hernia exists.

Use of an EEA stapler for end-to-end anastomosis to preserve the anal sphincter typically requires external palpation during the insertion of the EEA stapler into the patient's rectum.

Thus, almost all areas of medicine, including, but not limited to, anesthesia, gynecology, obstetrics, radiology, surgery, and orthopedics, involve procedures benefitting from simultaneous external and internal contact.

Healthcare training is an iterative process and must include opportunities to practice various clinical skills. One of the most important aspects of clinical training is assessment. Assessment allows learners to gauge their level of understanding or performance as compared to their colleagues or a pre-determined standard. Appropriate feedback is critical to mastering hands-on clinical skills. Medical training is the only defense in decreasing clinical errors. Thus, simulators that enhance the training of practitioners for procedures involving direct and indirect contact are desperately needed. Simulators that can reliably and accurately provide feedback to a practitioner as to the quality of their performance are also desirable.

SUMMARY

One aspect of the invention provides a system for medical training. The system includes an anatomical simulator modeled after at least a portion of a body and at least one external surface and at least one cavity in fluidic communication with the external surface via a cavity. The system further includes at least one internal sensor positioned at an internal location of the anatomical simulator, the internal sensor positioned to receive an internal input based on forces applied from within the cavity, and at least one external sensor positioned at an external location of the anatomical simulator, the external sensor positioned to receive an external input based on forces applied to the external surface. The system additionally includes a feedback display system in communication with the sensors to simultaneously record external sensor readings from the at least one external sensor and internal sensor readings from the at least one internal sensor. Additionally, the feedback display system further includes at least one time measurement device.

Another aspect of the invention provides a method for medical procedure training, including simultaneously sensing readings from external and internal sensors of an anatomical simulator. The anatomical simulator comprises at least one external surface, and at least one cavity, the cavity in fluidic communication with the external surface via a cavity, at least one internal sensor positioned at an internal location of the anatomical simulator, the internal sensor positioned to receive an internal input based on forces applied from the cavity, at least one external sensor positioned at an external location of the anatomical simulator, the external sensor positioned to receive an external input based on forces applied to the external surface. The method further includes displaying the sensed readings in real time.

Yet another aspect of the invention includes a system for medical training. The system includes means for simultaneously sensing readings from external and internal sensor sites of an anatomical simulator and means for displaying the sensed readings in real time.

The forgoing forms and other forms, features and advantages as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION

As described below and illustrated in FIGS. 1-10B, systems for medical training comprise an anatomical simulator having internal and external sensors. At least one internal sensor is positioned at an internal location of the simulator and at least one external sensor is positioned at an external location of the simulator. A feedback display system in communication with the sensors simultaneously provides external sensor reading from external contact and internal sensor readings from internal contact. The systems can be used for training a user for various procedures or examinations in medical, veterinary, and other fields.

Figure 1:
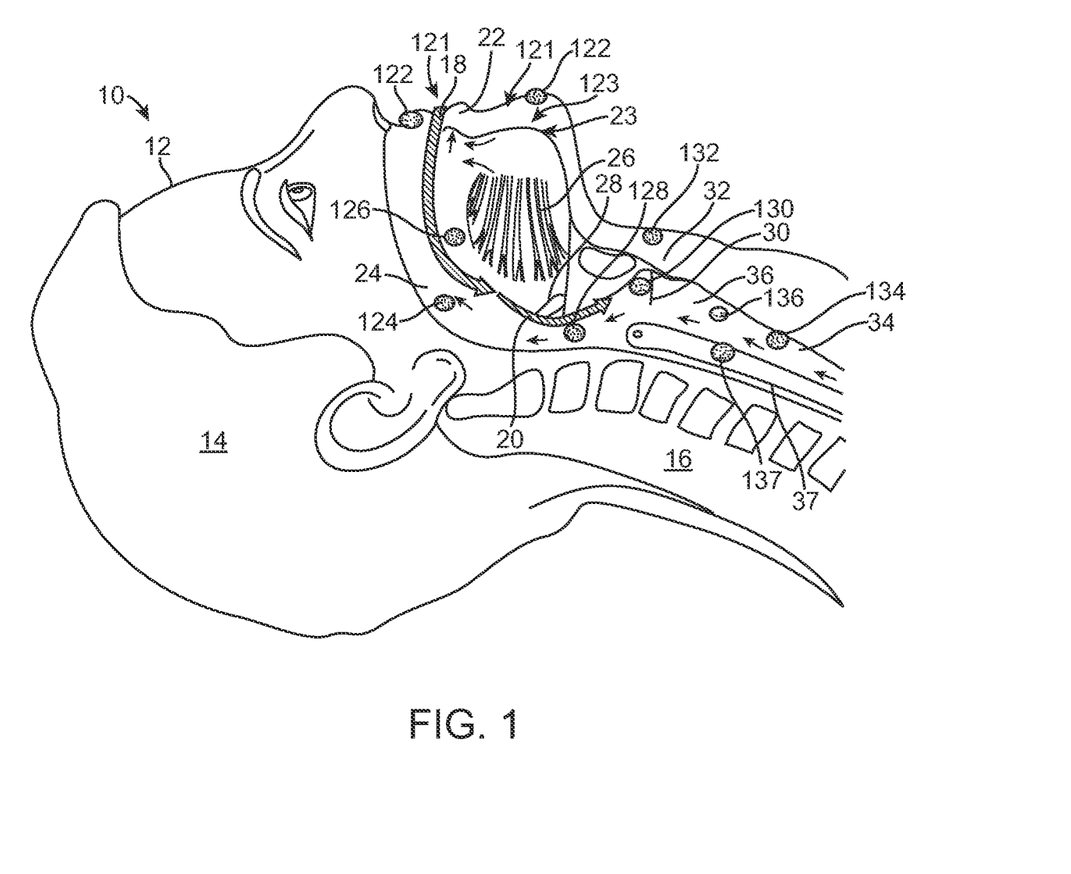
FIG. 1 is a schematic diagram of one embodiment of the system for intubation training.

FIG. 1 illustrates one embodiment of an anatomical simulator system 10 for medical training for endotracheal intubation in accordance with the present invention. System 10 comprises an anatomical simulator 12. Anatomical simulator 12 includes a head portion 14, a neck portion 16 and an internal cavity defined by the various anatomical structures of the mouth and throat. System 10 includes a plurality of sensors for detecting pressure and/or movement. External sensors are positioned on an outer surface of the simulator. External sensors are positioned at locations a user may touch by direct or indirect contact during the procedure. Internal sensors are positioned within the cavity defined by the mouth and throat. In one embodiment internal sensors are positioned along the airway for measuring pressure and movement along the laryngoscope path 18 and the endotracheal tube path 20. The sensors may be placed at any suitable location along the various pathways such as to provide the feedback necessary for evaluating a practitioner's performance.

During an intubation training procedure using a curved blade laryngoscope, a user opens the simulator mouth 22, contacting external sensors 122, and inserts a laryngoscope with the blade directed to the right tonsil 24. Once the right tonsil 24 is reached, the laryngoscope is swept to the midline, keeping the tongue 26 on the left to bring the epiglottis 28 into view. Internal sensors are positioned on the tonsil 124, the tongue 126, and the epiglottis 128. Internal sensors 124, 126 and 128 may be pressure sensors, movement sensors or a combination thereof. The laryngoscope blade is then advanced until it reaches the angle between the base of the tongue 26 and the epiglottis 28. Next, the laryngoscope is lifted upwards towards the chest and away from the nose to bring the vocal cords 30 into view. Often an assistant must press on the cricoid cartilage 32 on the trachea 34 to provide a direct view of the larynx 36. Internal sensors may be positioned on the vocal cords 130, trachea 134 and larynx 136 and external sensors on the cricoid cartilage 132. Internal sensors 130, 134 and 136 and external sensor 132 may be pressure sensors, movement sensors or combination thereof. The user then takes the endotracheal tube, made of flexible plastic, and starts inserting it through the mouth 22 opening. The tube is inserted through the vocal cords 30 to the point that the cuff of the tube rests just below the vocal cords 30 and may be inflated to be secured and sealed in place.

During an intubation procedure the endotracheal tube is not to enter into the esophagus 37. In one embodiment, an esophagus sensor 137 detects the misplacement of the tube into the esophagus. The esophagus sensor 137 may be a pressure sensor, a movement sensor or combination thereof. Moreover, during an intubation, care must be taken not to injure to the lips 21 and teeth 23. In one embodiment sensors 121 and 123 detect forces that may result in lip laceration or fractured teeth. Lip 121 and teeth 123 sensors may be pressure sensors, movement sensors or a combination thereof.

Figure 2:
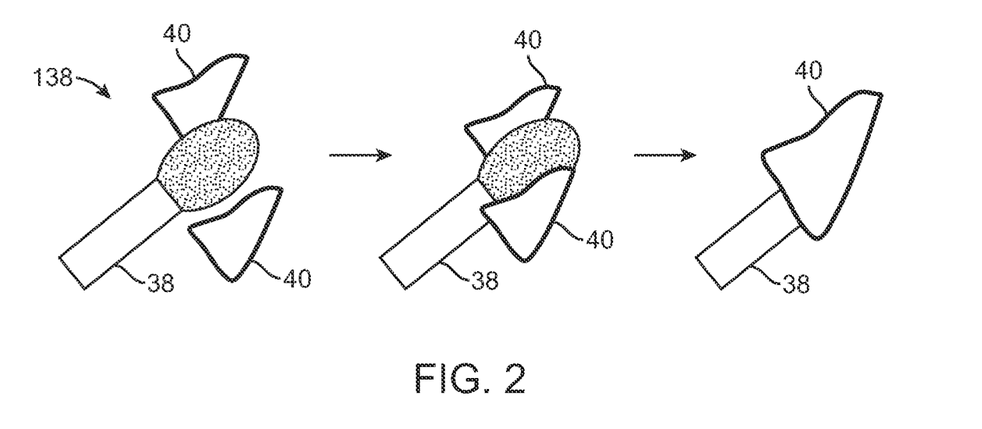
FIG. 2 is a schematic of a sensor assembled with artificial tissue as a vocal cord.
Figure 3:
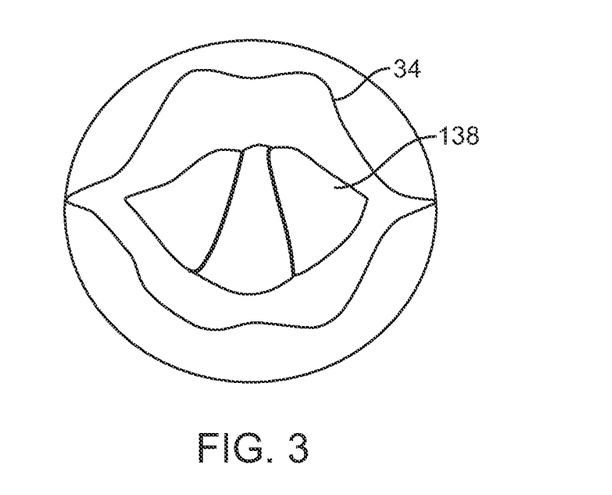
FIG. 3 is a schematic of the sensor of FIG. 2A in a trachea.

A sensor may itself represent a body surface, organ, or cavity. FIG. 2 illustrates the assembly of simulated vocal cord sensor 138 comprising a sensor 38 and simulated tissue 40. FIG. 3 illustrates the position of vocal cord sensors 138 in the trachea 34 of a simulator. Internal sensors 138 may be pressure sensors, movement sensors or a combination thereof.

Use of various other devices with system 10 is contemplated by the inventor and are included within the scope of the invention. Alternative devices considered for endotracheal intubation with system 10 include, but are not limited to: rigid bronchoscope; esophageal tracheal combitube and laryngeal mask airway.

Alternative training procedures using a method comprising system 10 contemplated by the inventor include, but are not limited to: tracheotomy, uvula palatoplasty, tonsillectomy, laryngectomy, and needle aspiration or incision and drainage of a peri-tonsilar abscess. With these alternative teaching procedures and simulators, the location and type of sensors, or combination of sensors, is adjusted to suit the particular need.

The anatomical simulator and feedback display system are adjustable for various medical training exercises. For example, the system for medical training illustrated in FIG. 4 is for diagnostic or therapeutic aspiration training, needle aspiration (also known as fine needle aspiration cytology), core needle biopsy and fine needle aspiration, which is a diagnostic procedure sometimes used to investigate lumps, cysts, or masses.

Figure 4:
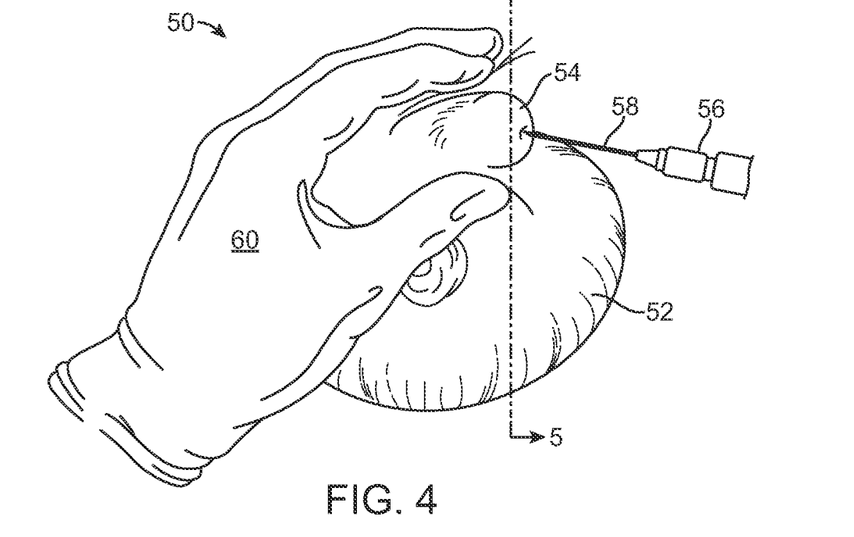
FIG. 4 is a schematic diagram of an embodiment of the system for aspiration training.
Figure 5:
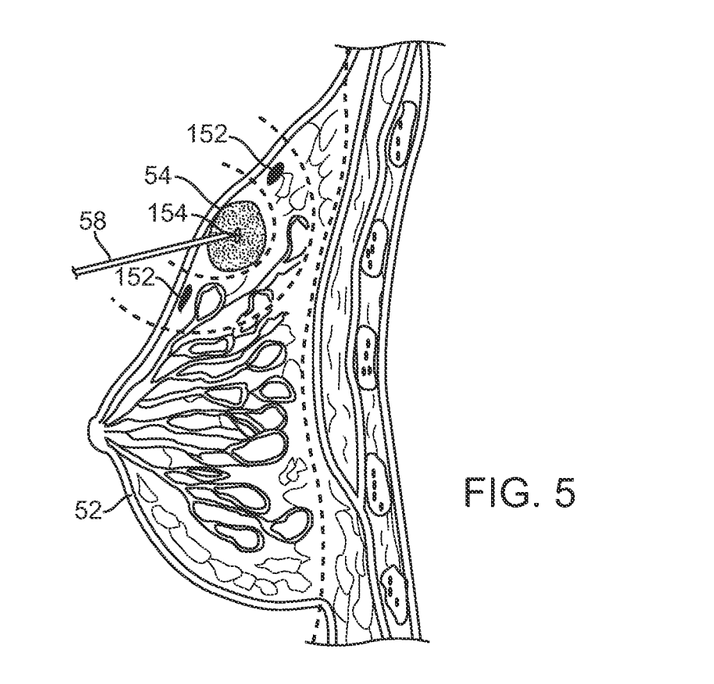
FIG. 5 is a cross section of FIG. 4 along line 5-5.

FIG. 4 illustrates one embodiment of a system comprising simulator 50. In this embodiment, simulator 50 is in the form of a breast 52 for diagnostic aspiration training of a mass 54. This procedure requires clinical skill to operate the syringe 56 and needle 58 with one hand to obtain a specimen and the use of palpation skills with the other hand 60 to locate mass 54. As shown in FIG. 5, simultaneous contact during these procedures involves direct contact with one hand on the tissues or body surface covering the mass 54 and indirect contact using a needle 58 that traverses several body layers to enter the center of the mass 54. One or more breast external sensors 152 detect pressure and/or movement on the surface of simulator 50. Sensors 154 in mass 54 detect pressure and/or position of needle 58 in mass 54.

Figure 6:
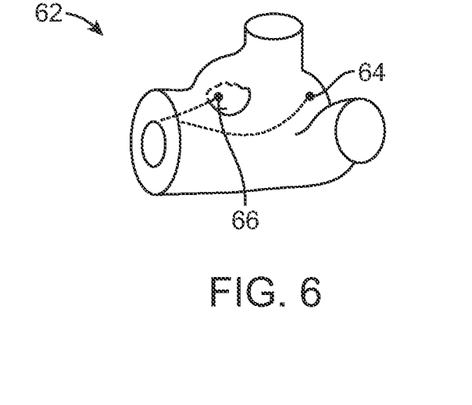
FIG. 6 is a schematic of a lower abdomen simulator with a cavity and an organ.
Figure 7:
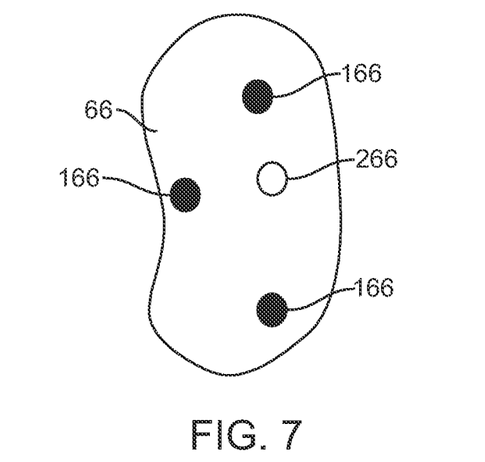
FIG. 7 is a schematic of an organ.

Systems for training in other medical procedures comprise anatomical simulators of a whole body or parts of a body. FIG. 6 illustrates a simulator 62 in the form of a lower torso and pelvic area of a body. Simulator 62 comprises a pelvic cavity 64 and an organ 66. Organ 66 is accessible through cavity 64. FIG. 7 illustrates organ 66. Organ 66 includes a plurality of external surface sensors 166 and internal sensors 266. Sensors 166 and 266 may be pressure sensors, movement sensors or a combination thereof.

Figure 8A:
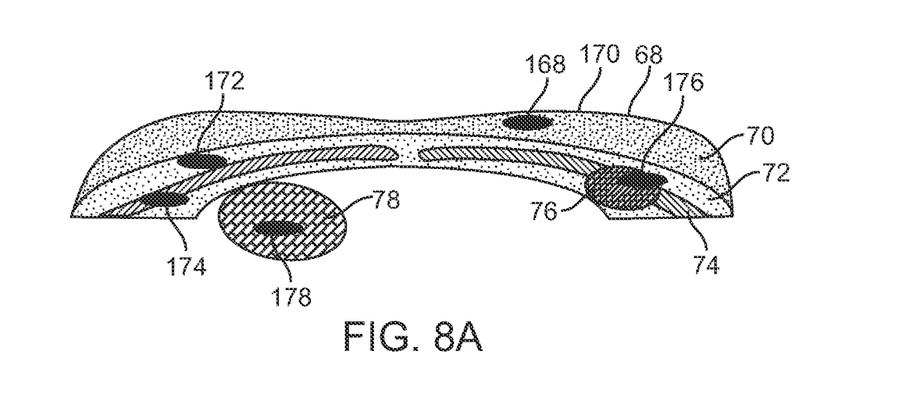
FIG. 8 is a cross section of a simulator.
Figure 8B:
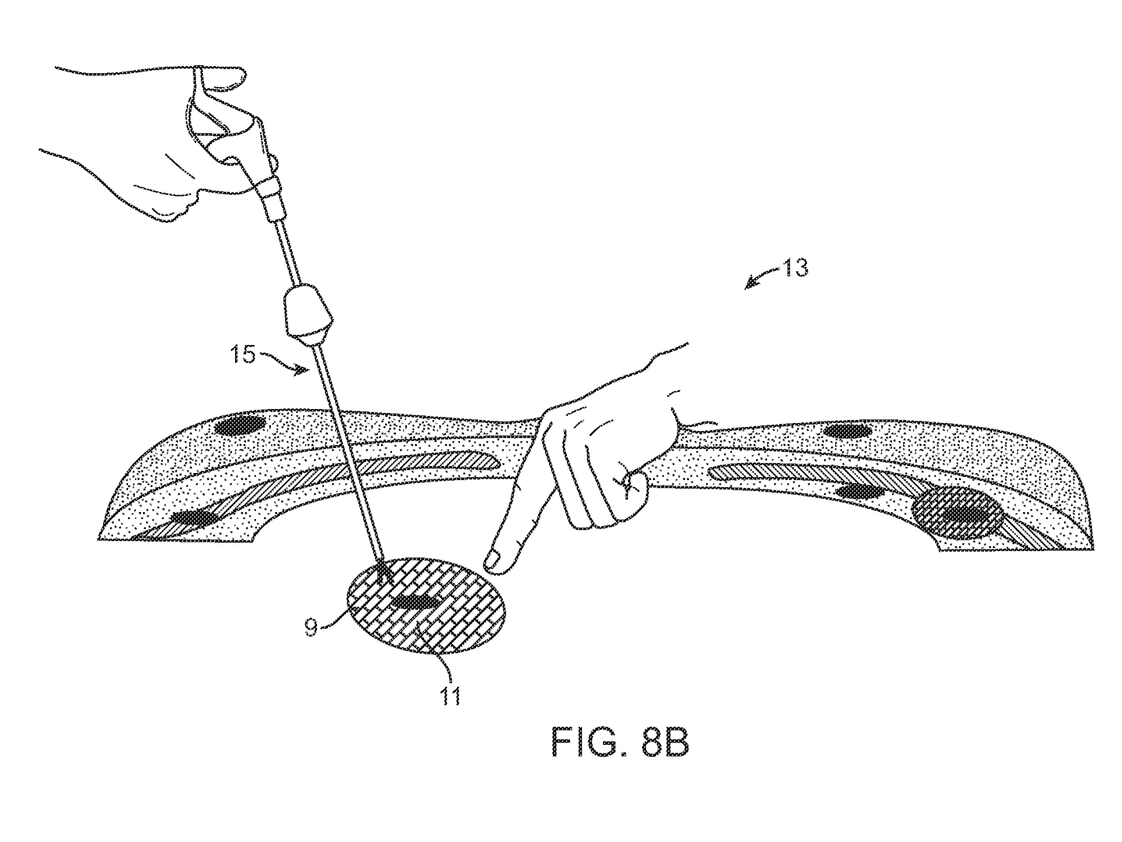
Figure 8C:
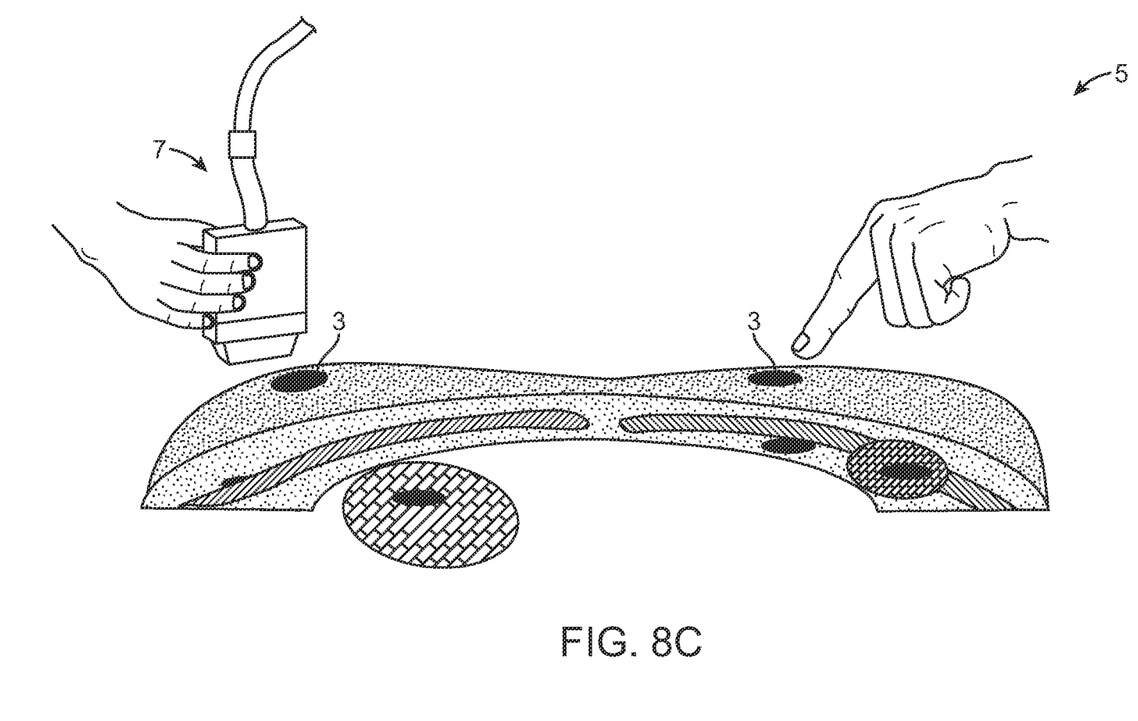

Sensors may be on/in various layers of tissue and/or within various organs, structures, or masses. FIG. 8A illustrates a cross-section of simulator comprising a surface 68 with a surface sensor 168, a first layer 70 with a sensor 170, a second layer 72 with a sensor 172, and a third layer 74 with a sensor 174. Also illustrated in FIG. 8 is mass 76 with sensor 176 and organ 78 with a sensor 178. Sensors 168, 170, 172, 174, 176 and 178 may be pressure sensors, movement sensors or a combination thereof. Similarly, FIG. 8B illustrates an internal sensor 11 inside an intra-abdominal organ 9 receiving force from a hand 13, as well as a laparoscopic grasper 15. In another similar embodiment, FIG. 8C illustrates the external sensors 3 being activated by an ultrasound transducer 7 and a hand 5 during an ultrasound examination. Other embodiments, such as hernia exam, vaginal exam or the like are anticipated and fall within the scope of this disclosure.

Various other medical procedures require a combination of direct contact such as palpation of a surface on a structure and/or body part, and indirect contact such as the use of a surgical instrument, ultrasound device, or needle. Many such procedures require identification of anatomical landmarks in locating or detecting structures or abnormalities under the surface. Examples of such procedures include, but are not limited to: central line and arterial line catheter placement, ultrasound use for instrument/needle guidance, vaginal and rectal ultrasound, use of instruments to facilitate childbirth, percutaneous endoscopic gastrostomy, and use of various gastrointestinal stapling devices. The present invention contemplates anatomical simulators suitable for teaching the proper techniques for performing these procedures without the need of a living patient. As will be understood by one with skill in the art, the placement of the sensors and the feedback obtained by the sensors varies depending on the specifications for each procedure.

Various types of sensors are contemplated for use with the system. These sensors include, but are not limited to, wireless sensors, pressure sensors, sheer stress sensors, movement sensors, nanosensors, microsensors and distributed sensors. One embodiment of the present invention includes wireless sensors. The wireless sensors transmit signals to the feedback system using radio frequency.

In another embodiment, a distributed sensor is placed in a sheet around an organ or in a lining of a cavity, for example. The distributed sensor tracks pressure, movement and/or contact location along the sheet during a procedure and provides information to the feedback system for analysis. The feedback system is described in more detail, below. In one embodiment of the present invention, a distributed tactile sensor is placed so that all manual contact (with one or both hands) a student or practitioner makes with the cavity or organ is detected by the sensor. In this embodiment, a more thorough and accurate evaluation of the student's or practitioner's performance can be made with a distributed sensor.

For instances where the targeted area is an open space inside a cavity, such as the larynx, one or more sensors are positioned on the boundaries of the cavity.

The optimal number, location, and type of sensors vary with the pathological or normal condition represented by the simulator and with the desired fidelity. For example, in one embodiment an intubation simulator includes sensors on the teeth in the mouth of the intubation simulator, as well as those sensors described above.

Figure 9:
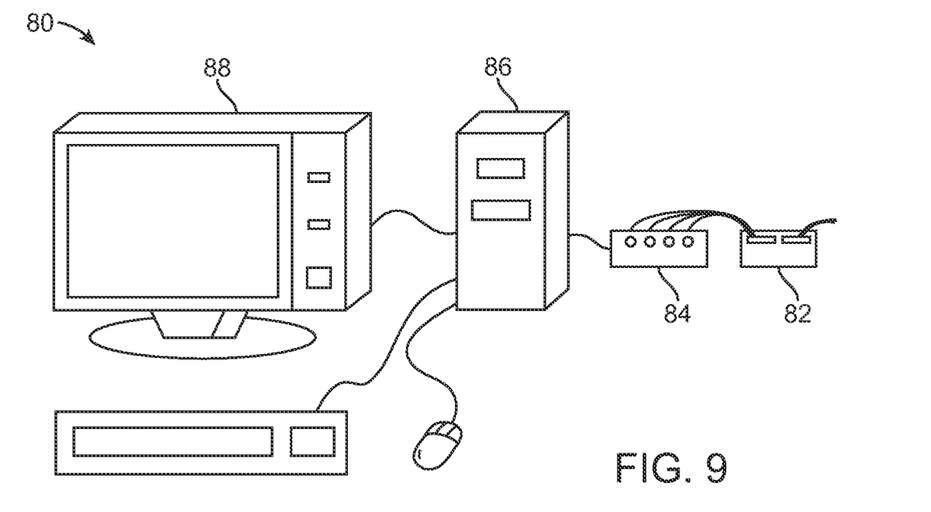
FIG. 9 is a schematic of a feedback display system.

Signals from sensors are transmitted to a feedback system including a time measurement device. FIG. 9 illustrates one embodiment in which feedback is provided by graphical display on a monitor. In other embodiments, the feedback may be printed to paper. Signals from the sensors are displayed by a feedback display system 80. Sensors are in communication with an amplifier 82 and an interface 84 before being fed into a computer 86 with memory and displayed on a monitor 88. Feedback display system 80 displays signals from sensors to indicate pressure, movement, or both pressure and movement simultaneously. Feedback may be provided as any type of feedback, including visual, auditory, tactile, olfactory, or any combination of types. In one embodiment the system includes detachable sensors that are placed on the user's hand or instruments. This will facilitate the collection of detailed performance measures. In one embodiment, the feedback display system includes filters to limit interference between sensors. The feedback display system is able to chart the received signals against an elapsed time as determined by the time measurement device.

Figure 10A:
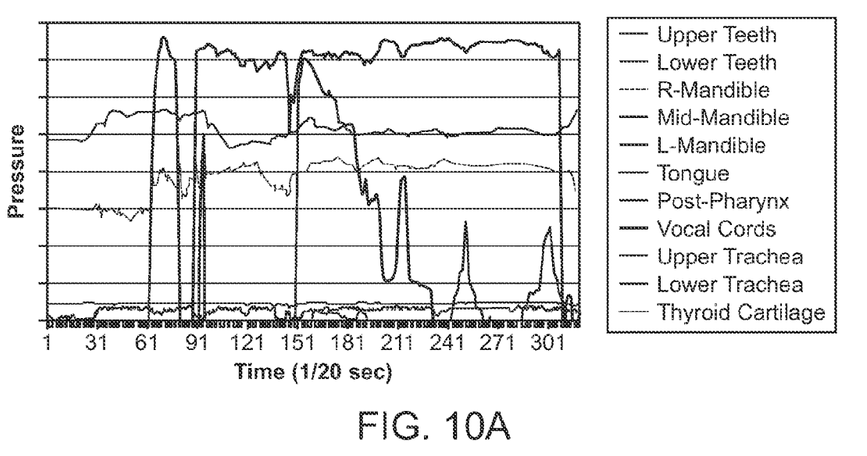
FIG. 10A is a monitor display of an experienced practitioner during intubation training.
Figure 10B:
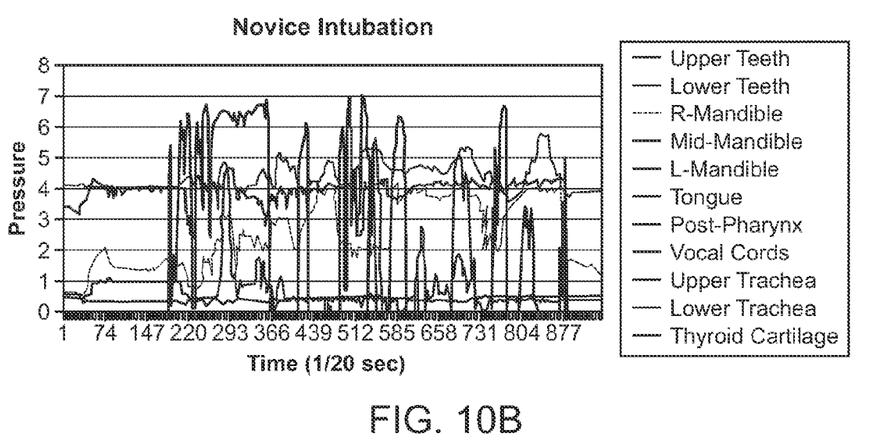
FIG. 10B is a monitor display of a novice practitioner during intubation training.

Shown in FIGS. 10A and 10B is a recorded sensor data during a simulated intubation. The line graph representations of an expert intubation (FIG. 10A) are compared to a novice intubation (FIG. 10B). Of note, the line graph captures user performance over time and shows each of the body surfaces and cavities that the user interacted with during the procedure and how the users manipulations effects the body surfaces and cavities.

In one embodiment, the feedback display system comprises a computer system containing a computer; input and output devices such as a display means, printers or monitor, keyboard, or mouse; and an interface for interfacing the sensors with the computer. In one embodiment, the computer includes a RISC processor configured to exclusively perform a reduced instruction set to accomplish the method steps disclosed herein. In another embodiment, the computer comprises standard elements such as a processor, data bus, various memories, and data storage devices. In one embodiment, the interface contains lines and converting means for converting the set of signals from sensor into inputs for computer. For some sensors, analog voltage signals from the sensor must be converted into digital inputs to the computer using standard hardware and methods known in the art. For example, a sensor is connected to quad op-amplifiers on a bread board by twisted wire. Bread board is also connected to an in-and-out connector block, which is connected through a serial port of computer to a data acquisition card within computer. While the embodiments of a feedback display system illustrate a typical computer system, other embodiments are possible. For example, the interface may instead be implemented with wireless devices. Alternatively, the entire computer system and sensor are contained within a single small unit within the simulator, and the feedback, e.g., auditory feedback, is provided directly from the small unit.

The objective of the feedback provided by the feedback presentation unit is to train the student to recognize characteristics of the internal surface of the cavity by touch alone, and to enable the student to recognize the appropriate levels of force to apply, both by recognizing when too much force is applied, as well as if too little force is applied. While the description herein refers primarily to students, it is to be understood that the present invention can be used to train any current or future health care professionals such as medical students, nursing students, residents, or practicing physicians or other professionals. Furthermore, it can also be used by professionals who already know the exam or procedure but want to refresh or test their skills.

Viewing real-time feedback and receiving instructor guidance based on that feedback together allow the student to determine what he or she should be feeling, and then internalize that knowledge. Accordingly, the feedback presentation unit provides any type of feedback, including positive, negative, or summative, that attains the above objective. Feedback can be provided in visual, auditory, tactile, or olfactory format, or any combination of these. In one embodiment, computer readable code stored within memory and executed by the computer's processor instructs the computer to process the inputs originating from the sensor or sensors to create feedback for the student and instructor. In general, the type of feedback and manner in which it is conveyed to the student are tailored to the educational objectives, type of exam, and ability and experience level of the student, among other factors. Preferably, a single system contains a number of possible variations of the feedback, selectable by the student or instructor. Upon reading this description, one of average skill in the art will be able to write appropriate computer readable code to implement the various embodiments of the present invention.

One embodiment of the feedback is a real-time graphical display of the sensor inputs. A monitor display of graphical feedback provides instantaneous pressure readings from the sensors. In the exam that produces a display, the student must palpate specific regions with a minimum pressure. Elapsed time stops either when the student palpates all of the required areas, or when the user clicks "Stop" button. Similarly, the student begins the exam by clicking "Start" button.

Within a computer readable code, the instructor sets the minimum required pressure and a range of prescribed pressures. Alternatively, when the code is first executed, the computer requests pressure information from the instructor. Appropriate pressures vary with the patient's clinical condition, student's hand size or expertise, and other variables. Many other relevant graphical displays can be imagined, depending on the type and distribution of sensors, exam type, student experience, and other factors. For example, the graphical display can include a map corresponding to the pattern of pressure applied. The graphical display can be implemented using standard techniques, programming languages, and commercial software development tools, as apparent to one of average skill in the art.

The present invention may be made portable and inexpensive through the use of alternative feedback presentation units. One embodiment of a portable training system comprises a simulator containing sensors is connected with a display screen. Both are mounted on a support. The resulting presentation unit is simple and lightweight and provides a graphical display of the pressures exerted by a student. In one embodiment, such a presentation unit contains simplified processing means specifically for processing inputs from the sensors.

An alternative feedback presentation unit includes an LCD (liquid crystal display) display unit. Inputs to the unit are displayed as digital pressure readings. Also contained on a base are light sources that generate light when the pressure exceeds a minimum. It is well known in the art how to translate voltage signals into accurate LCD displays.

The system of the present invention can be adapted for use in training facilities without access to computers or even basic electronics, for example, in developing nations. Rather than electronic sensors that produce voltage signals, the sensors may be fluid-filled sacs placed at desired locations on the manikin. In this case, the feedback presentation unit is a set of manometers, interfaced to the sensors by plastic tubing. Because of the low pressures required, water manometers made from thin glass tubing would be suitable.

A general embodiment of a method of training a student or practitioner using a simulator system includes a student contacting a simulator, and the sensor within the simulator transferring information to a feedback presentation unit which provides feedback to the student. The student may modify the contact with simulator based on the received feedback.

In one embodiment of a feedback system, a student contacts a simulator containing a sensor that generates a signal. The signal is transferred to a feedback presentation unit. In addition, feedback presentation unit includes a controller for adjusting the behavior or structure of the simulator, according to either a preset program or in response to contact supplied by the student. The student perceives this change and adjusts the contact accordingly. In another embodiment, the initial three interactions among a student, a simulator, and a feedback presentation unit still exists. Now, student must also interact directly with feedback presentation unit, either by answering questions posed or by describing information gathered through contact with the simulator. For example, in one simulation a diseased "patient" may require further medical treatment. Based on the exam results, the student inputs treatment recommendation into the computer. Student inputs can be through any input device, such as a keyboard, mouse, joystick, pen, microphone and speech-recognition element, or some combination of these devices. Another embodiment, the so-called virtual reality embodiment, still contains the original three interactions among a student, a simulator, and a feedback presentation unit. In this embodiment, simulator is not an anatomical mannequin, but a robot or virtual reality (VR) glove that responds to the student's hand movements by applying a force to the student's hand. For example, the student watches an image of a patient that is correlated with the movement of the VR glove. Only the portion of the student's hand remaining outside the patient body is visible. As the student performs the exam, the glove provides tactile feedback corresponding to the inner surface of the body cavity, simulating the feeling a student would have performing the exam on a live patient. The moving glove is in some ways more representative of a live patient than is a mannequin. Combinations of the above four embodiments will be obvious to one skilled in the art upon reading this description, and are therefore within the scope of the present invention.

In one embodiment, the feedback is compared to a prior or ideal user. In addition, a computer useable medium storing a program for medical training with the system may comprise computer readable code for receiving simultaneously sensed pressure readings from external and internal sensor sites of an anatomical simulator and computer readable code for displaying the sensed signals in real time. The display of sensed readings further comprises a comparative display of ideal sensed readings from the memory.

Within the computer readable code, the instructor sets the minimum required pressure and a range of prescribed pressures. Alternatively, when the code is first executed, the computer requests pressure information from the instructor. Appropriate pressures vary with the patient's clinical condition, student's hand size or expertise, and other variables. Many other relevant graphical displays can be imagined, depending on the type and distribution of sensors, exam type, student experience, and other factors. For example, the graphical display can include a map corresponding to the pattern of pressure applied. The graphical display can be implemented using standard techniques, programming languages, and commercial software development tools, as apparent to one of average skill in the art.

A method for medical procedure training comprise simultaneously sensing readings from external and internal sensor sites of an anatomical simulator and displaying the sensed readings in real time. The displaying step may use auditory or visual cues, or both, to the user.

System 10 is designed for use by a student and instructor together. Standard operation proceeds as follows. First, the instructor performs the exam while the student watches graphical display and notices the appropriate palpation pressure and duration and exam timing. Next, the student performs the exam while the instructor watches graphical display and gives feedback to the student. The student integrates tactile information with instructor feedback to gain a better understanding of proper exam technique.

In an alternative embodiment of the computer readable code, the computer memory contains a stored reference exam. The reference exam consists of pressure versus time data for each sensor, and may be obtained from an average of exams performed by a professor, clinician, or other expert. For a distributed sensor, the stored exam also contains location data. There may be multiple stored reference exams, each associated with a diseased condition of a removable part of the simulator or other condition. During the exam performance, inputs are stored as pressure versus time data for each sensor. The student data is compared with the stored reference exam to derive a rating for the exam or to give instruction during the exam. The rating can be based on coverage, pressure levels, duration of pressure at a given location, overall exam time, or any other suitable measure. Signals from a distributed sensor in one embodiment are in the form of diagram of the simulator with an indication, such as by color, of the pressure and/or movement of the user's hand and/or instrument.

In FIG. 10A, a monitor displays performance ratings after the student completes an exam performance. In one embodiment the reference exam is displayed in a reference exam graph, which displays pressure versus time for each of the sensors. Of course, reference exam graph depends on the number and type of sensors used. Also displayed are previous performance graph and current performance graph. Previous results for the same student may be stored in a data storage device and displayed to demonstrate the student's progress.

Also displayed are qualitative ratings for the performance: a time rating, a pressure rating, and an accuracy rating. Any suitable ratings system may be developed for the present invention, including quantitative ratings systems.

In a further alternative embodiment, the feedback is instruction, preferably audio instruction, provided to the student during the performance. For example, if the computer input indicates that the pressure is below the reference exam pressure at a given location, but above the background pressure, the computer readable code directs play of an audio file that says "press a little harder." This embodiment can be used by a student alone or with a student partner; an instructor is not required.

The computer system can also contain storage means for storing video signals and associated audio signals representing a realistic patient environment. Preferably, the audio and video signals are located in files stored in the memory or storage device of the computer. The computer readable code controls presentation of the files to the student.

In one embodiment, the computer system maintains a database of exams and cases that can be regularly updated by a user. For example, a senior resident performs a patient exam and records a video of the patient and procedure. She then devises a reference exam case containing the procedure she performed, her diagnosis, and a recommended treatment. The case along with the associated video is incorporated into the database and used to train a junior resident. The junior resident views the video and performs an exam on the simulator to determine whether he arrives at the same diagnosis and treatment recommendation as the senior resident.

In addition to providing feedback to the student and instructor during performance of the exam, the computer can also store student performance data and ratings. Later, the instructor can examine the data of students that did not perform adequately to determine which part of the exam or technique the student is having difficulty learning. The instructor can then tailor instruction to address the student's deficiencies. Students may also assess their own performance and practice on certain areas before seeking the advice of an instructor.

Without the anatomical simulator systems described above, the assessment data for the various procedures of prior art devices would either: 1) not be collected, 2) only record the movements of the medical device, or 3) simply note whether the procedure obtained the desired result, for example, whether a breathing tube was placed in the airway. None of the prior art devices provide detailed performance feedback to the user in a manner as described above. In essence, documentation of successful placement of a breathing tube in the airway (intubation), for example, does not disclose in an objective or quantitative fashion whether unnecessary tissue damage occurred or whether the intubation completion time was prolonged due to several manipulations of the laryngoscope which in turn may result in anoxic brain injury or death.

Detailed, individualized performance assessments for complex clinical procedures are possible when using the systems of the present invention. Moreover, instead of providing basic, summative feedback on how the user moved an instrument, this system has the ability to provide detailed, formative feedback on how a combination of direct and indirect manual maneuvers effect multiple body surfaces, organs or cavities and whether these maneuvers were performed correctly.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A system for medical training of an endotracheal intubation procedure, comprising:
    an anatomical simulator modeled after a head portion, a neck portion, a cricoid cartilage area and an internal cavity defined by portions of a mouth, a throat, a tongue, a vocal cord, a trachea, a larynx, an esophagus and an epiglottis;
    an intubation tube;
    internal sensors located within said internal cavity and positioned on or near said portions defined for said internal cavity, wherein said internal sensors measure pressure and movement induced by said intubation tube along a laryngoscope path and an endotracheal tube path of said anatomical simulator during said endotracheal intubation training procedure;
    external sensors positioned on or near said cricoid cartilage area, wherein said external sensors measure movement and pressure applied by a user during said endotracheal intubation training procedure; and
    a feedback display system in communication with the sensors to simultaneously record and display external sensor readings from said external sensors and internal sensor readings from said internal sensors,
    wherein said simultaneous recording of said sensor readings comprises recording: (i) a sensor reading resulting from direct manual contact by a user or an assistant user, simultaneously with (ii) a sensor readings resulting from indirect contact by a surgical instrument operated by said user.

2. The system of claim 1, wherein the anatomical simulator and feedback display system are adjustable for multiple medical training exercises.

3. The system as set forth in claim 1, wherein said sensors measure pressure and movement induced by said intubation tube along a laryngoscope path and an endotracheal tube path of said anatomical simulator.

4. The system as set forth in claim 1, wherein said sensors to measure pressure and movement applied by said user are positioned on or near said cricoid cartilage area.

5. A method for medical training of an endotracheal intubation procedure, comprising:
    providing an anatomical simulator modeled after a head portion, a neck portion, a cricoid cartilage area and an internal cavity defined by portions of a mouth, a throat, a tongue, a vocal cord, a trachea, a larynx, an esophagus and an epiglottis;
    inserting a medical instrument into said internal cavity;
    sensing pressure and movement induced by said medical instrument during said endotracheal intubation training procedure, wherein said sensing utilizes internal sensors located within said internal cavity to measure pressure and movement induced by said medical instrument along a laryngoscope path and an endotracheal tube path of said anatomical simulator and positioned on or near said portions defined for said internal cavity;
    direct sensing utilizing external sensors to measure movement and pressure applied by a user during said endotracheal intubation training procedure; and
    providing a feedback display system to simultaneously record and display internal sensor readings from said internal sensors and external sensor readings from said external sensors, wherein said simultaneous recording of said sensor readings comprises recording: (i) a sensor reading resulting from direct manual contact by a user or an assistant user, simultaneously with (ii) a sensor readings resulting from indirect contact by a surgical instrument operated by said user.

6. The method as set forth in claim 5, wherein said medical instrument is an intubation tube, a bronchoscope, or a laryngoscope.

7. The method as set forth in claim 5, further comprising pressure and movement applied by said user are positioned on or near said cricoid cartilage area.

* * * * *